United States Patent [19]

Bridges et al.

[11] 3,743,927
[45] July 3, 1973

[54] APPARATUS FOR MEASURING CONTACT AND RETRACTILE FORCES OF MAGNETICALLY OPERATED SWITCHES

[75] Inventors: Robert O. Bridges, Winston-Salem, N.C.; Paul W. Renaut, Columbus, Ohio

[73] Assignees: Western Electric Company, Incorporated, New York, N.Y. ; by said Bridges; Bell Telephone Laboratories, Incorporated, Murray Hill, Berkely Heights, N.J. ; by said Renaut

[22] Filed: May 22, 1972

[21] Appl. No.: 255,579

[52] U.S. Cl. .......................... 324/28 RS, 324/43 R
[51] Int. Cl. .......................................... G01r 31/00
[58] Field of Search ...................... 324/28 RS, 28 R, 324/43 R

[56] References Cited
UNITED STATES PATENTS

| | | | |
|---|---|---|---|
| 3,253,214 | 5/1966 | Heilweil et al. ................. | 324/28 R |
| 3,252,083 | 5/1966 | Wagar ............................... | 324/28 R |
| 3,250,988 | 5/1966 | McGrath .......................... | 324/28 R |
| 2,406,870 | 9/1946 | Vacquier .......................... | 324/43 R |

Primary Examiner—Rudolph V. Rolinec
Assistant Examiner—Rolf Hille
Attorney—W. M. Kain, W. L. Williamson et al.

[57] ABSTRACT

Apparatus automatically determines the ratio of the contact force at saturation and the retractile force of magnetic reeds by measuring the magnetic flux at saturation and release of a sealed contact switch. Additionally, the ampere-turns of the operate and release points of the switch are monitored to test the switch.

6 Claims, 5 Drawing Figures

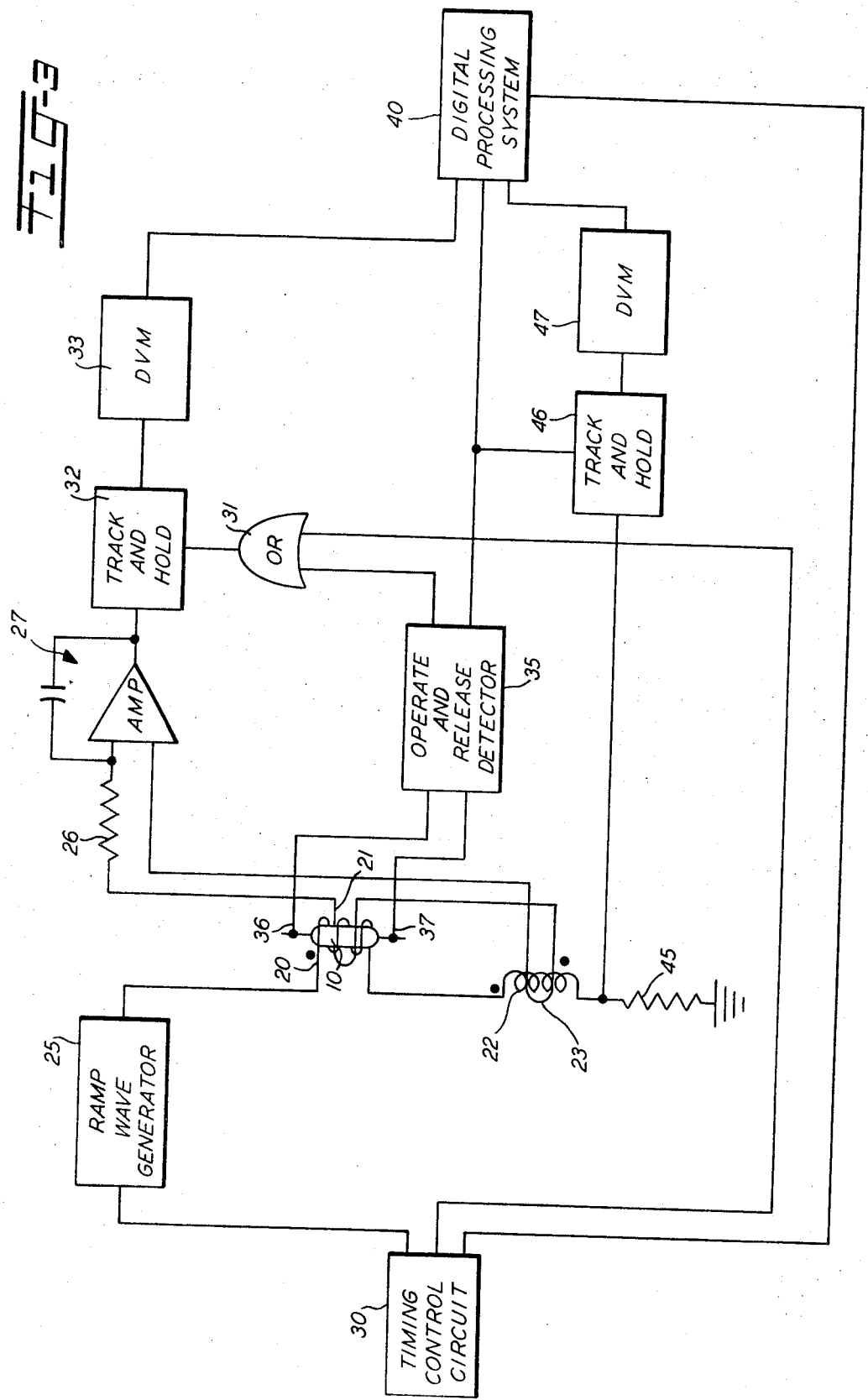

APPARATUS FOR MEASURING CONTACT AND RETRACTILE FORCES OF MAGNETICALLY OPERATED SWITCHES

BACKGROUND OF THE INVENTION

1. Field of the Invention

Switches having magnetic reeds or contacts operated by magnetic fields, such as sealed contact switches, are manufactured in large quantities for use in switching systems, such as telephone systems. This invention is concerned with apparatus for testing the switches to determine any switches which do not have proper operating charcteristics. One of the chief causes of failures of such switches is the sticking of the contacts together. Sticking is defined as the condition which exists when the contacts fail to open or release when the magnetic operating force for the switch is reduced to a value well below the specified limit for release of the switch. The tendency to stick is related to a number of factors including lateral, longitudinal, or rotational misalignment, surface condition of the contacts, and the plating of the contacts. It would be desirable to determine switches which have a tendency to stick.

2. Prior Art

There are a number of prior art apparatus for testing sealed contact switches to determine that they operate and release with predetermined magnetic fields applied thereto. Examples of such test sets are described in U.S. Pat. No. 2,924,333 to F. Kulick et al. issued on Feb. 9, 1960, and U.S. Pat. No. 3,250,988 to J. W. McGrath issued on May 10, 1966.

There are two methods of screening switches for misalignment which are commonly used. The first is by visually inspecting the individual switches under a microscope. This is a slow and costly process. The second is by a dynamic capacitance test for rotational and longitudinal misalignment and a static capacitance test for lateral and overlap misalignment. The dynamic capacitance test is complex and difficult to perform and unreliable in results. The static capacitance test, while simple to perform, does not yield much information regarding contact misalignment.

It has been previously known that the ratio of contact force at saturation to the retractile force of the contacts can be used to determine the tendency of a sealed contact switch to stick. Such ratios have been manually computed from readings taken from conventional magnetic flux measuring apparatus. One such conventional flux measuring apparatus utilizes a standard coil having therein a pair of search coils connected in series opposition. A sealed contact switch is placed in one of the search coils and a manually operated voltage source is used to apply an increasing and then decreasing current through the standard coil. The difference output of the coils is integrated and recorded on a graph from which data is taken to determine the contact force at saturation and the retractile force of the contacts. Such a manually operated apparatus and procedure is impractical for testing large quantities of sealed contact switches.

SUMMARY OF THE INVENTION

An object of the invention is an improved apparatus for testing sealed contact switches to determine tendencies of the switch to fail.

Another object of the invention is an apparatus for automatically testing large quantities of sealed contact switches to determine switches not having proper operating characteristics.

In accordance with these and other objects of the invention, an apparatus employs first and second standard coils with first and second search coils coupled to the respective standard coils wherein a sealed contact switch is positioned in the first standard coil and first search coil. An increasing and then decreasing current is applied serially through the first and second standard coils while the difference between the signals induced in the first and second search coils is integrated to produce an analog signal indicative of the magnetic flux through the magnetic contacts of the switch. Facilities produce a first control pulse when the current reaches a maximum magnitude. A second control pulse is produced when the contacts are released. The first and second control pulses operate automatic facilities for measuring the magnitude of the analog signal. In addition, facilities are also incorporated to measure the current through the standard coils at operate and release of the switch.

BRIEF DESCRIPTION OF THE DRAWING

FIG. 3 is a block diagram of a circuit for testing the sealed contact switch of FIG. 1 in accordance with the principles of the invention;

DETAILED DESCRIPTION

Figure 1:
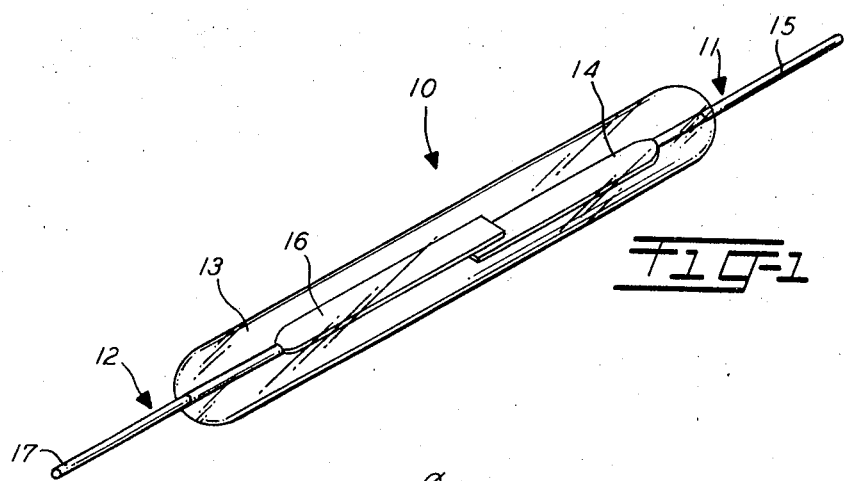
FIG. 1 shows a sealed contact switch.

Referring to FIG. 1, there is shown a sealed contact switch 10 having a pair of reeds 11 and 12 mounted in a sealed enclosure 13. The reed 11 has a flattened portion 14 with a lead portion 15 extending outside the enclosure 13. Similarly, the reed 12 has a flattened portion 16 with a lead portion 17 extending outside the glass enclosure 13. The reeds 11 and 12, or at least the flattened portions 14 and 16, are made from a metal or alloy having ferromagnetic properties with low retentivity. The enclosure 13 is made from a non-magnetic material, such as glass. The flattened portions 14 and 16 are overlapped and spaced apart such that the application of a magnetic potential gradient of predetermined magnitude along the longitudinal direction of the reeds 11 and 12 forces the two portions 14 and 16 into engagement. The overlapping ends of the portions 14 and 16 may be plated with suitable metals or alloys to produce selected contact properties.

Figure 2:
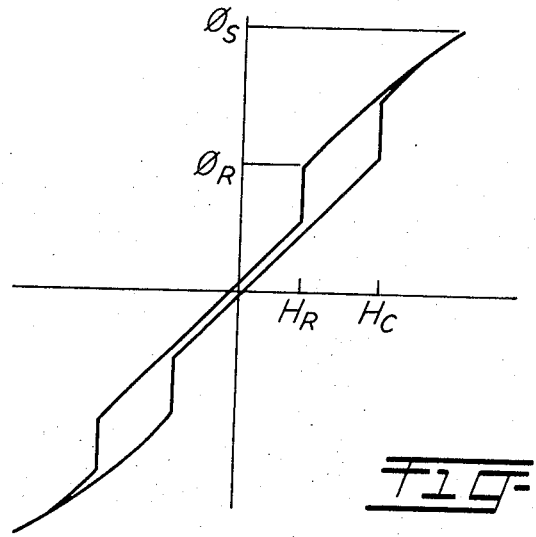
FIG. 2 illustrates a hysteresis curve for the sealed contact switch of FIG. 1.

Referring to FIG. 2, there is shown a hysteresis curve of the reeds of the switch 10 showing magnetic flux $\phi$ through the reeds as the magnetic potential gradient H is increased and decreased in a cycle. When the magnetic potential gradient reaches $H_c$, the reeds 11 and 12 close. Further increase of the magnetic potential gradient results in saturation of the reeds with a magnetic flux $\phi s$. When the magnetic potential gradient is reduced to $H_R$ the magnetic force due to the flux $\phi_R$ is insufficient to maintain the reeds 11 and 12 in their closed condition and the reeds 11 and 12 open.

The tendency of the sealed contact switch 10 to fail by not opening when the magnetic flux is reduced to a magnitude less than $\phi_R$ has been previously found to be related to the ratio of the force that the portions 14 and 16 exert on one another at saturation and the retractile force of the portions 14 and 16. This ratio, hereinafter called the contact retractile force ratio, can be expressed by the equation $R = F_S/F_{RC}$ where $F_S$ is the force the reeds exert on one another at saturation and $F_{RC}$ is the retractile force of the reeds when they are in a closed position. The retractile force is the mechanical elastic force of the reeds urging them to return to their open positions. The magnetic force $F_M$ on the reeds due to a magnetic field is given by $F_M = K\phi^2$ where K is a constant and $\phi$ is the magnetic flux in the gap or passing longitudinally through the reeds. As the reeds are urged together by the magnetic force, there is also a retractile force which is proportional to the displacement to the reeds from their rest position. The net force F acting on the reeds is the difference between the magnetic force $F_M$ and the retractile force $F_R$ or $F = F_M - F_R$. At saturation, the net force $F_S$ acting on the reeds is $F_S = F_{MS} - F_{RC}$ where $F_{MS}$ is the magnetic force at saturation and $F_{RC}$ is the retractile force when the reeds are closed. At the point of release ($H_R$ in FIG. 2), the magnetic force is just cancelled by the retractile force and the net force is 0; therefore, $F_{MR} = F_{RC} = K\phi_R^2$ where $F_{MR}$ and $K\phi_R^2$ are the magnetic force at release. From the above relationships, the equation for contract retractile force ratio $R = (\phi_S/\phi_R)^2 - 1$, where $\phi_S$ is the magnetic flux at saturation and $\phi_R$ is the magnetic flux at release, can be mathematically derived.

Figure 4:
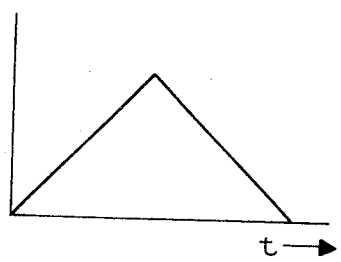
FIG. 4 illustrates the magnitude of current relative to time applied to standard coils by a ramp generator of FIG. 3.
Figure 5:
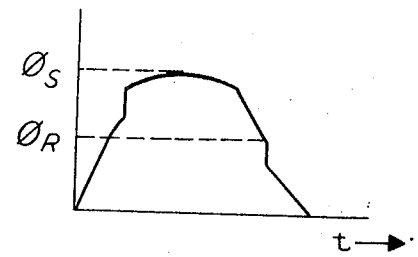
FIG. 5 illustrates the magnitude of magnetic flux relative to time within the reeds of the switch of FIG. 1.

Referring to FIG. 3, the switch 10 is placed within a standard solenoid 20 which has a search coil 21 wound about its center. The standard coil 20 is connected in series with an identical standard coil 22 while the search coil 21 is connected in opposition with a search coil 23 on the coil 22 in an identical manner to the coil 21 wound on the coil 20. A ramp generator 25 applies an increasing and decreasing current pulse, as illustrated in FIG. 4, through the coils 20 and 22. Since the coils 21 and 23 are connected in opposition, the sum of the output of the coils 21 and 23 will be only the flux which appears through the reeds of the switch 10. The output of the search coils 21 and 23 is applied through a resistor 26 to an integrating circuit 27. The output of the integrating circuit 27 is shown in FIG. 5 and represents the longitudinal flux through the reeds 11 and 12 of the sealed contact switch 10. A timing control circuit 30 operates the ramp generator 25 and also applies a signal at the peak of output current of the ramp generator 25 through an OR gate 31 to track and hold circuit 32. The output of the track and hold circuit 32 follows the output of the integrating circuit 27. When the track and hold circuit 32 is pulsed by the timing control circuit 30, the output of the track and hold circuit 32 is held at the same level for a duration sufficient to allow a digital volt meter 33 sufficient time to read the value of the output.

An operate and release detector circuit 35 is connected by contacts 36 and 37 to respective leads of the sealed contact switch 10. Upon release of the sealed contact 10, the operate and release detector 35 produces a pulse which is applied to the OR gate 31 to again operate the track and hold circuit 32. Thus, the track and hold circuit 32 reads and holds the output of the integrator 27 at the release point to allow the digital volt meter 33 to read that signal. The flux readings at saturation and release are applied to a digital processing system 40 along with the operating pulses from the operate and release detector 34 and the timing control circuit 30. The digital processing system is used to calculate the contact retractile force ratio hereinbefore described. The digital processing system may include a commercially available general purpose computer which is programmed to receive the information from the digital volt meter 33, the timing control circuit 30 and the operate and release detector 35 and perform mathematical calculations on the information received.

In addition to the above-described measurements of the ratio of the contact retractile force to the saturation force, the circuit shown in FIG. 2 senses the current through the coils 20 and 22 by a resistor 45. A track and hold circuit 46 is operated by pulses from the operate and release detector at the close and opening of the switch 10 to produce readings on a digital volt meter 47. The readings from the digital volt meter 47 are also applied to the digital processing system 40. Thus, the digital processing system 40 may readily determine all the parameters of the switch 10 and cause the rejection of the switch 10 by automatic sealed contact handling apparatus, such as that described in U.S. Pat. No. 2,924,333 issued on Feb. 9, 1960, to F. Kulick et al.

The above-described embodiment of the invention is simply illustrative of the principles of the invention and many embodiments may be devised without departing from the scope and spirit of the invention.

What is claimed is:

1. An apparatus for testing a sealed contact switch wherein magnetic reeds are closed by a magnetic field to complete a circuit, comprising:

a first standard coil for receiving a sealed contact;

a second standard coil substantially identical to the first standard coil connected in series with the first standard coil and having no magnetic object received therein;

means for applying an increasing current and then a decreasing current through the first and second standard coils, said current having a maximum magnitude sufficient to cause saturation of the magnetic reeds;

a first search coil coupled to the first standard coil;

a second search coil substantially identical to the first search coil, coupled to the second standard coil and connected in series opposition with the first search coil to produce an output difference voltage indicative of the change in magnetic flux through the reeds;

means for integrating the output difference voltage from the first and second search coils to produce an analog signal indicative of the magnetic flux through the reeds;

means for generating a first control pulse when said current through the first and second standard coils is at about said maximum magnitude;

means for detecting when the magnetic reeds open to produce a second control pulse; and means responsive to the first and second control pulses for measuring the analog signal at saturation and release of the contact switch to determine a property of the sealed contact switch.

2. An apparatus as defined in claim 1 wherein the measuring means includes a track and hold circuit to maintain the analog signal indicative of the magnetic flux at the release of the contact switch for a sufficient duration to permit the measuring of the analog signal.

3. An apparatus as defined in claim 2 wherein the measuring means includes means for converting the analog signal to a digital signal and means for automatically processing the digital signal to produce the ratio of the force on the contacts at saturation to the retractile force of the reeds.

4. An apparatus for testing a sealed contact switch wherein magnetic reeds are closed by a magnetic field to complete a circuit, comprising:
- a first standard coil for receiving a sealed contact switch;
- a second standard coil substantially identical to the first standard coil connected in series with the first standard coil and having no magnetic object received therein;
- means for applying an increasing current and then a decreasing current through the first and second standard coils, said current having a maximum magnitude sufficient to cause saturation of the magnetic reeds;
- a first search coil coupled to the first standard coil;
- a second search coil substantially identical to the first search coil, coupled to the second standard coil and connected in series opposition with the first search coil to produce an output difference voltage indicative of the change in magnetic flux through the reeds;
- means for integrating the output difference voltage from the first and second search coils to produce an analog signal indicative of the magnetic flux through the magnetic reeds;
- means for generating a first control pulse when said current through the first and second standard coils is at about said maximum magnitude;
- means for detecting when the magnetic reeds close and open to produce respective second and third control pulses;
- means responsive to the first and third control pulses for measuring the analog signal at saturation and release of the contact switch; and
- means responsive to the second and third control pulses for measuring the current through the first and second standard coils at close and release of the contact switch.

5. An apparatus defined in claim 4 wherein:
- the analog signal measuring means includes a first track and hold circuit for momentarily maintaining the analog signal of the magnetic flux at the first and third control pulses to permit the measuring of the analog signal; and
- the current measuring means includes a second track and hold circuit for momentarily maintaining the value of the current through first and second standard coils to permit the measuring of the current.

6. An apparatus as defined in claim 5 wherein the analog signal measuring means includes:
- means for converting the analog signal to a digital signal; and
- means for automatically processing the digital signal to determine an acceptable ratio of the force on the contacts at saturation to the retractile force of the reeds.

* * * * *